(12) United States Patent
Ghannam et al.

(10) Patent No.: US 12,503,117 B2
(45) Date of Patent: Dec. 23, 2025

(54) SYSTEM AND METHOD FOR MANAGING HYDROPLANING FOR A VEHICLE

(71) Applicant: Ford Global Technologies, LLC, Dearborn, MI (US)

(72) Inventors: Mahmoud Ghannam, Canton, MI (US); Aed Dudar, Canton, MI (US)

(*) Notice: Subject to any disclaimer, the term of this patent is extended or adjusted under 35 U.S.C. 154(b) by 322 days.

(21) Appl. No.: 18/167,821

(22) Filed: Feb. 10, 2023

(65) Prior Publication Data
US 2024/0270253 A1    Aug. 15, 2024

(51) Int. Cl.
| | |
|---|---|
| *B60W 30/18* | (2012.01) |
| *B60W 10/08* | (2006.01) |
| *B60W 10/20* | (2006.01) |
| *B60W 30/02* | (2012.01) |
| *B60W 40/06* | (2012.01) |

(52) U.S. Cl.
CPC ...... *B60W 30/18172* (2013.01); *B60W 10/08* (2013.01); *B60W 10/20* (2013.01); *B60W 30/02* (2013.01); *B60W 40/06* (2013.01); *B60W 2520/30* (2013.01); *B60W 2530/10* (2013.01); *B60W 2552/00* (2020.02); *B60W 2555/20* (2020.02)

(58) Field of Classification Search
CPC ...... B60W 10/08; B60W 10/20; B60W 30/02; B60W 30/18172; B60W 40/06
See application file for complete search history.

(56) References Cited

U.S. PATENT DOCUMENTS

| | | | |
|---|---|---|---|
| 10,597,032 B2 | 3/2020 | Kelly et al. | |
| 2007/0255465 A1* | 11/2007 | Brown | B60G 17/0165 |
| | | | 701/37 |

(Continued)

FOREIGN PATENT DOCUMENTS

| | | |
|---|---|---|
| CN | 107380168 A | 11/2017 |
| CN | 114670799 A | 6/2022 |
| DE | 102013214804 A1 | 1/2015 |

OTHER PUBLICATIONS

Elin Olsson, CFD Modeling of Wading With Electric Vehicles, Chalmers University of Technology, 2018, 1-81.

*Primary Examiner* — Seth A Silverman
(74) *Attorney, Agent, or Firm* — Frank Lollo; Eversheds Sutherland (US) LLP

(57) ABSTRACT

A vehicle having a transceiver and a processor is disclosed. The transceiver may receive environment condition, road condition, and vehicle information. The processor may be communicatively coupled with the transceiver, and may obtain the environment condition, the road condition, and the vehicle information from the transceiver. The processor may determine that the vehicle may be in an unstable driving state based on the obtained condition. Responsive to determining that the vehicle may be in the unstable driving state, the processor may determine a vehicle instability type based on the environment condition, the road condition, and the vehicle information. The processor may be further configured to generate a first instruction for a first vehicle wheel and a second instruction for a second vehicle wheel based on the vehicle instability type, and cause a vehicle movement based on the first instruction and the second instruction.

20 Claims, 6 Drawing Sheets

(56) References Cited

U.S. PATENT DOCUMENTS

| | | | |
|---|---|---|---|
| 2009/0178876 A1* | 7/2009 | Miki | B62D 9/00 |
| | | | 701/41 |
| 2012/0279793 A1 | 11/2012 | Kikuchi et al. | |
| 2014/0195118 A1* | 7/2014 | Okubo | B60W 10/18 |
| | | | 701/41 |
| 2015/0006049 A1* | 1/2015 | Watanabe | B60W 50/038 |
| | | | 701/67 |
| 2017/0101103 A1* | 4/2017 | Foster | A01B 63/11 |
| 2017/0282869 A1* | 10/2017 | Tong | B60T 7/22 |
| 2019/0064812 A1* | 2/2019 | Melgar | G05D 1/0088 |
| 2021/0179142 A1* | 6/2021 | Horibe | B60W 60/00184 |
| 2022/0119010 A1* | 4/2022 | Beaurepaire | G08G 1/22 |

* cited by examiner

SYSTEM AND METHOD FOR MANAGING HYDROPLANING FOR A VEHICLE

TECHNICAL FIELD

The present disclosure relates to systems and methods for managing hydroplaning for a vehicle and more particularly to systems and methods for controlling operation of vehicle drive motors and wheels to counter hydroplaning and similar environmental challenges.

BACKGROUND

Hydroplaning may occur when a layer of water builds between vehicle tires and a road surface, leading to loss of traction by the tires. The loss of traction may cause inconvenience to a vehicle user and may result in loss of control of vehicle steering, braking, and/or speed.

A conventional method to prevent hydroplaning includes providing grooves on rubber tires that may disperse water from beneath the tires and provide high friction even in wet road conditions. However, in scenarios where water flow on the road may be high or when the grooves on the tires are worn due to wear and tear, the grooves may not be effective in preventing hydroplaning.

Similarly, the user may experience loss of vehicle control when the vehicle may be travelling on a road covered with snow, sand, mud, etc. For example, the user may experience loss of vehicle control when one or more tires may be stuck in the snow.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
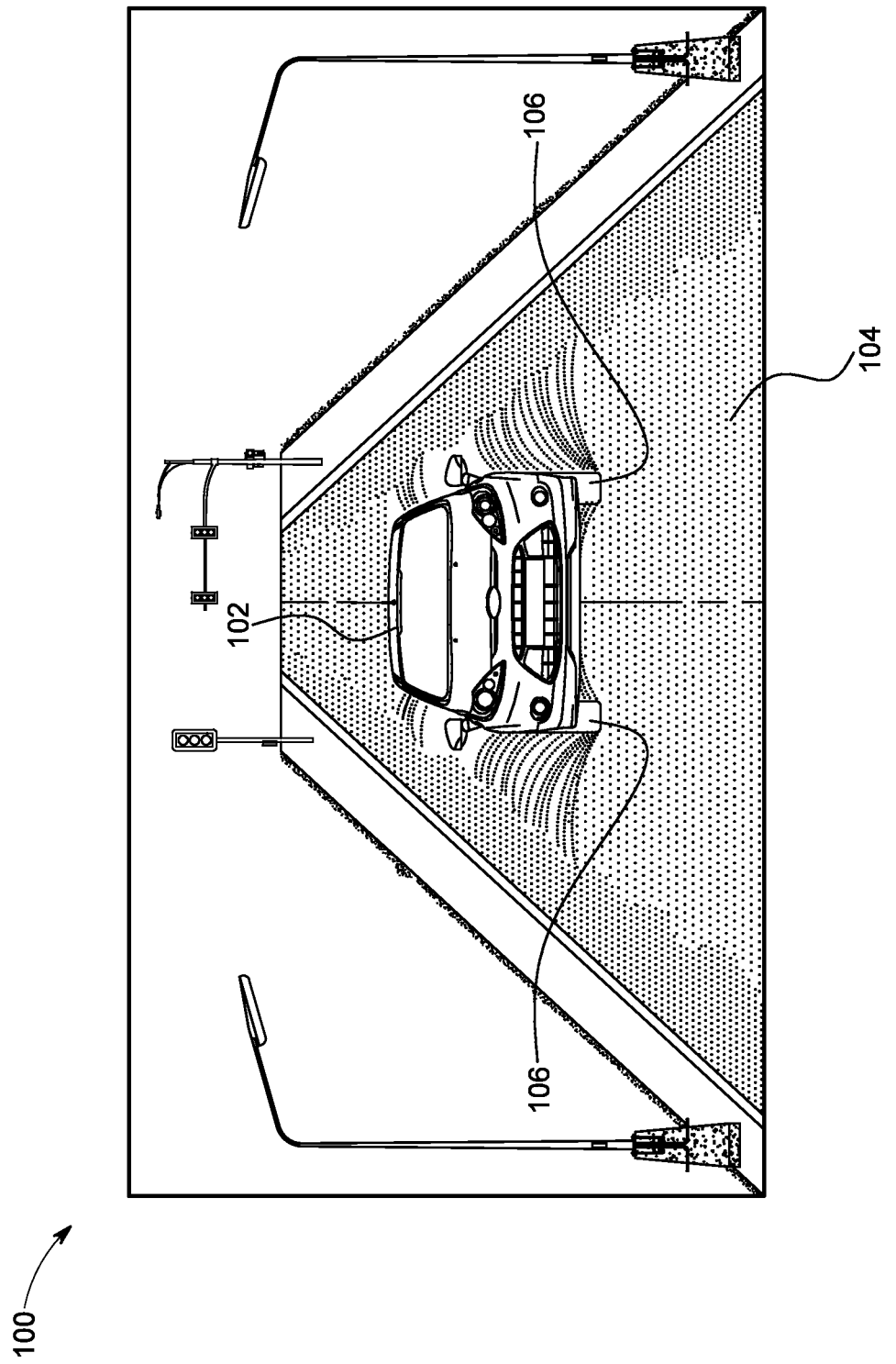
FIG. 1 depicts an example environment in which techniques and structures for providing the systems and methods disclosed herein may be implemented.

The present disclosure describes a system and method for managing hydroplaning and environmentally challenging conditions for a vehicle. The vehicle may be an Electric Vehicle (EV) having a drive motor and a steering actuator associated with each wheel. Any suitable vehicle may be used herein. Each wheel may be configured to move with a torque and/or a rotation angle independent of torque and rotation angles of other wheels. The system may be configured to control operation of the drive motor and the steering actuator to enable the vehicle to counter the hydroplaning and environmentally challenging conditions. The system may control drive motor and/or steering actuator operation based on environment condition, road condition, and vehicle information.

In some aspects, the system may obtain the environment condition, the road condition, and the vehicle information from one or more servers and/or vehicle sensors. The environment condition may include wind conditions, temperature, weather condition, etc. The road condition may include water condition on road, pre-wetting condition, etc. The vehicle information may include vehicle driving condition, wheel condition, vehicle design, vehicle weight, etc. Responsive to obtaining the conditions/information, the system may determine that the vehicle may be in an unstable state (e.g., may have lost traction and may not be in control of vehicle operator). The system may further determine a vehicle instability type, responsive to determining that the vehicle may be unstable. For example, the system may determine that the vehicle may be in hydroplaning condition or may be stuck in snow based on the obtained conditions/information.

The system may be further configured to generate instructions for one or more wheels (or each wheel) based on the vehicle instability type. For example, the system may generate a first instruction when the vehicle is in the hydroplaning condition and may generate a second instruction when the vehicle is stuck in snow. In particular, the system may generate instructions to change wheel torque, wheel rotation angle, and/or the like to counter the unstable state. The system may transmit the instructions to respective drive motor and/or the steering actuator. The drive motor and the steering actuator may receive the instructions and may control vehicle movement based on the instruction.

In further aspects, the system may transmit the environment condition, the road condition, the vehicle information/condition, and the wheel torque, wheel rotation angle (from the generated instructions) to an external server (e.g., cloud) for storage purpose. In further aspects, the system may store the environment condition, the road condition, the vehicle information, the wheel torque, and the wheel rotation angle in a system memory. The system may use the stored information and an Artificial Intelligence/Machine Learning (AI/ML) algorithm to manage hydroplaning and environmentally challenging conditions for the vehicle (or any other similar vehicle), when the vehicle navigates in similar conditions. For example, when the system determines that the vehicle may be navigating in same or similar conditions (such as road or environment conditions, e.g., based on historical environment condition, the road condition, vehicle historical usage/travel pattern, etc.), the system may control the wheel torque, the wheel rotation angle, etc. based on the stored information, and may not calculate/determine wheel torque and/or wheel rotation angle again. This way, the system may save computational resources, and may "re-use" stored information if the road and/or the environment conditions are same or similar as earlier trips of the vehicle. Further, in this case, if the road and/or environment condition is different from earlier trips, the system may "re-calculate" or "re-determine" the wheel torque and wheel rotation angle by updating only the road and/or environment condition in the stored information.

The present disclosure discloses a system that manages/counters environmentally challenging situations (e.g., hydroplaning condition) that a vehicle may be experiencing. In particular, the system may manage sudden hydroplaning conditions, e.g., due to sudden rain or snowfall, and enable the vehicle to counter the conditions. The system factors-in real-time environment, road and vehicle condition/information and automatically determines counter measures, thereby maintaining vehicle stability and preventing loss of vehicle control.

These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 that may take the form of any passenger or commercial vehicle such as, for example, an off-road vehicle, a car, a crossover vehicle, a van, a minivan, a bus, a truck, etc. In some aspects, the vehicle 102 may be a Battery Electric Vehicle (BEV). Further, the vehicle 102 may be a manually driven vehicle and/or may be configured to operate in fully autonomous (e.g., driverless) mode (e.g., Level-5 autonomy) or in one or more partial autonomy modes which may include driver assist technologies. In an exemplary aspect, the vehicle 102 may be travelling on a road 104 that may have water for example, due to outpour, drain blockage, broken pipe, leakage system, etc.

The vehicle 102 may have four wheels 106 including a driver front side wheel, a driver rear side wheel, a passenger front side wheel, and a passenger rear side wheel. The vehicle 102 may be configured to independently control movement of each wheel 106. In particular, each wheel 106 may have its own independent drive motor (shown as wheel drive motor 242 in FIG. 2) and steering actuator (shown as steering actuator 244 in FIG. 2) that may enable the vehicle 102 to independently control torque, torque polarity, and wheel rotation angle of each wheel 106. Independent movement control of each wheel 106 may enable a vehicle operator or a vehicle stability control system ("system", shown as vehicle stability control system 208 in FIG. 2) to counter vehicle hydroplaning and/or environmentally challenging conditions.

The system may be configured to receive/obtain environment condition, road condition, and vehicle information. In particular, the system may obtain the environment condition, the road condition (including water condition on the road 104), and the vehicle information from one or more vehicle sensors or from a server (shown as server 220 in FIG. 2). The system may obtain the environment condition, the road condition, and the vehicle information at a predefined interval/frequency, e.g., every 1 or 2 seconds. Responsive to obtaining the environment condition, the road condition, and the vehicle information, the system may determine that the vehicle 102 may be in an unstable driving state. For example, the system may determine that the vehicle 102 may have lost traction with the road 104 based on the obtained condition information.

The system may further determine a vehicle instability type responsive to determining that the vehicle 102 may be in the unstable driving state. For example, the system may determine whether the vehicle 102 may be sliding (e.g., in hydroplaning condition), floating, spinning, stuck in snow/mud, etc. In some aspects, the system may determine the vehicle instability type based on the environment condition, the road condition, and the vehicle information. For example, the system may determine presence of water on the road 104 from the obtained road condition and wheel 106 conditions from the obtained vehicle information, and may accordingly determine that the vehicle 102 may be in the hydroplaning condition.

In additional aspects, the system may be configured to control operation of each steering actuator and wheel drive motor to counter the unstable driving state, based on the determined vehicle instability type. In particular, the system may generate individual instructions for each vehicle wheel 106 based on the vehicle instability type, and transmit the instructions to respective steering actuator and wheel drive motor to cause wheel movement (and corresponding vehicle movement) based on the generated instructions. For example, when the system determines that the vehicle 102 may be sliding, the system may control torque and/or rotation angles of one or more wheels from the wheels 106 such that the vehicle 102 may return to a stable driving position. The details of the system may be understood in conjunction with FIG. 2.

In additional aspects, the system may transmit the wheel torque and wheel rotation angle (from the generated instructions) to an external server (e.g., cloud) for storage purpose. In further aspects, the system may store the wheel torque and wheel rotation angle in a system memory. The system memory and the external server may also store the environment condition, the road condition, the vehicle information/condition obtained by the system. The system may "re-use" the stored wheel torque and wheel rotation angle on a future vehicle trip, when the system determines that the vehicle 102 may be navigating in same or similar conditions. For example, the system may determine that the vehicle 102 may be navigating in same or similar conditions based on the real-time road condition and environment condition obtained by the system, and/or the vehicle historical usage/travel pattern. In this case, the system may save computational resources by "re-using" stored wheel torque and wheel rotation angle, if the road condition and/or the environment condition is similar to earlier trips. In case the road condition and/or the environment condition is different from earlier trips, the system may update the stored wheel torque and wheel rotation angle by using updated road information and/or environment information.

The external server (e.g., cloud) may also share the stored wheel torque and wheel rotation angle to other vehicles, so that the other vehicles may also use the wheel torque and wheel rotation angle if the vehicles navigate in same or similar conditions.

Figure 2:
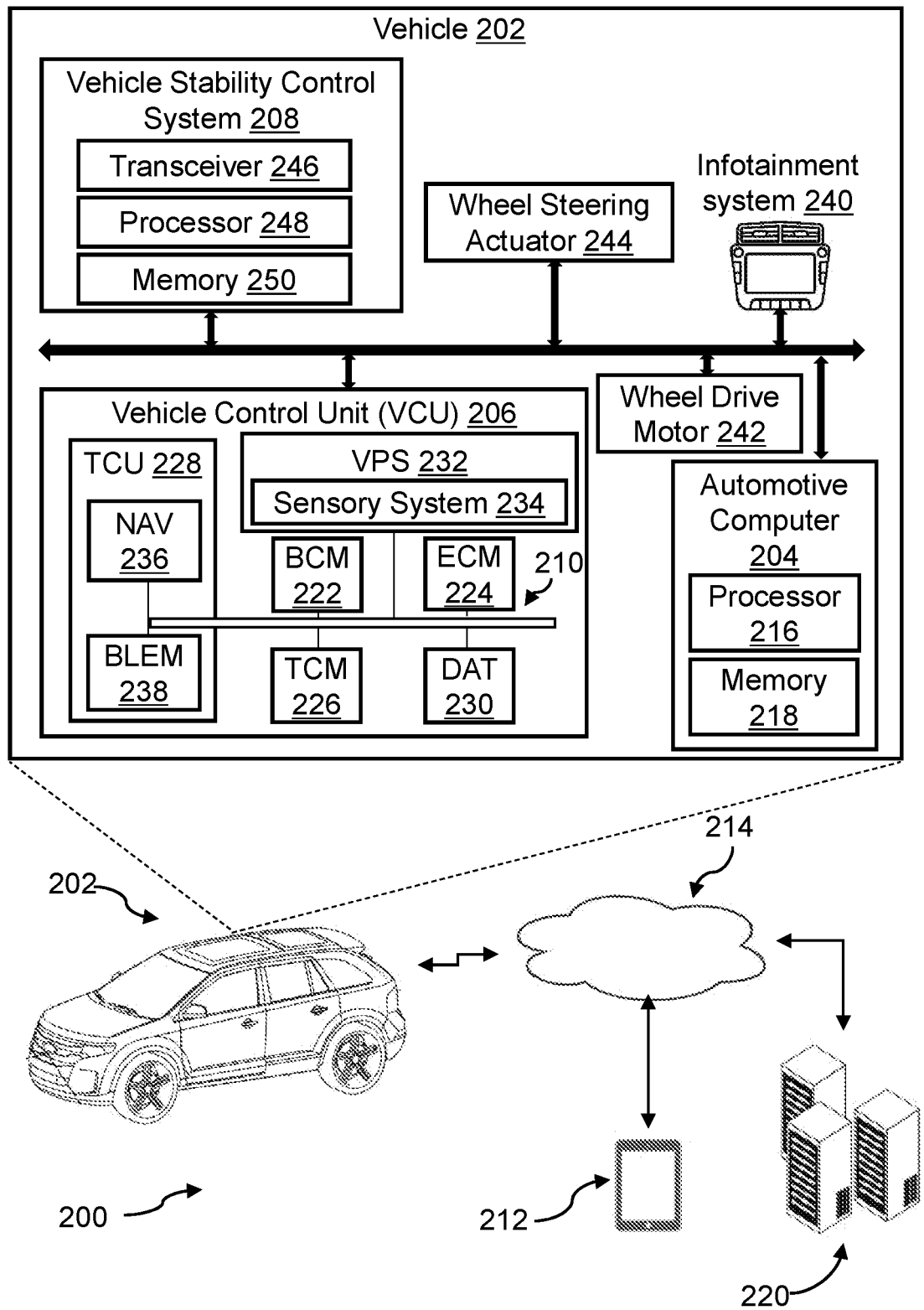
FIG. 2 depicts an example system for managing hydroplaning and environmentally challenging conditions in accordance with the present disclosure.

FIG. 2 illustrates a block diagram of an example system 200 for managing hydroplaning and environmentally challenging conditions in accordance with the present disclosure. The system 200 may include a vehicle 202, which may be same as the vehicle 102. The vehicle 202 may include an automotive computer 204, a Vehicle Control Unit (VCU) 206, and a vehicle stability control system 208 (same as the vehicle stability control system described in conjunction with FIG. 1). The VCU 206 may include a plurality of Electronic Control Units (ECUs) 210 disposed in communication with the automotive computer 204.

The system 200 may further include a mobile device 212 that may connect with the automotive computer 204 and/or the vehicle stability control system 208 by using wired and/or wireless communication protocols and transceivers. In some aspects, the mobile device 212 may be associated with a vehicle user/operator (not shown). The mobile device 212 may communicatively couple with the vehicle 202 via one or more network(s) 214, which may communicate via one or more wireless connection(s), and/or may connect with the vehicle 202 directly by using near field communication (NFC) protocols, Bluetooth® protocols, Wi-Fi, Ultra-Wide Band (UWB), and other possible data connection and sharing techniques.

The network(s) 214 illustrates an example communication infrastructure in which the connected devices discussed in various embodiments of this disclosure may communicate. The network(s) 214 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In some aspects, the automotive computer 204 and/or the vehicle stability control system 208 may be installed in a vehicle engine compartment (or elsewhere in the vehicle 202), in accordance with the disclosure. Further, the automotive computer 204 may operate as a functional part of the vehicle stability control system 208. The automotive computer 204 may be or include an electronic vehicle controller, having one or more processor(s) 216 and a memory 218. Moreover, the vehicle stability control system 208 may be separate from the automotive computer 204 (as shown in FIG. 2) or may be integrated as part of the automotive computer 204.

The processor(s) 216 may be disposed in communication with one or more memory devices disposed in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable memory storing a vehicle stability control program code. The memory 218 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.). In some aspects, the memory 218 may additionally store one or more vehicle 202 information, e.g., vehicle weight, vehicle design, vehicle historical usage/travel information, wheel condition, etc.

The automotive computer 204 and/or the vehicle stability control system 208 may be disposed in communication with one or more server(s) 220 and the mobile device 212 via the network 214. In some aspects, the server(s) 220 may be part of a cloud-based computing infrastructure and may be associated with and/or include a Telematics Service Delivery Network (SDN) that provides digital data services to the vehicle 202 and other vehicles (not shown in FIG. 2) that may be part of a vehicle fleet. In additional aspects, the server(s) 220 may be associated with Global Positioning System (GPS) and may store information associated with the road 104 condition (e.g., water logging information, road pre-wetting condition, etc.). In other aspects, the server(s) 220 may store environment condition (e.g., rain or snow forecast, wind speed/direction, temperature, weather condition, etc.), and/or the like.

In accordance with some aspects, the VCU 206 may share a power bus with the automotive computer 204, and may be configured and/or programmed to coordinate the data between vehicle 202 systems, connected servers (e.g., the server(s) 220), and other vehicles (not shown in FIG. 2) operating as part of a vehicle fleet. The VCU 206 can include or communicate with any combination of the ECUs 210, such as, for example, a Body Control Module (BCM) 222, an Engine Control Module (ECM) 224, a Transmission Control Module (TCM) 226, a telematics control unit (TCU) 228, a Driver Assistances Technologies (DAT) controller 230, etc. The VCU 206 may further include and/or communicate with a Vehicle Perception System (VPS) 232, having connectivity with and/or control of one or more vehicle sensory system(s) 234. The vehicle sensory system 234 may include one or more vehicle sensors including, but not limited to, a Radio Detection and Ranging (RADAR or "radar") sensor configured for detection and localization of objects inside and outside the vehicle 202 using radio waves, sitting area buckle sensors, sitting area sensors, a Light Detecting and Ranging (LiDAR or "lidar") sensor, door sensors, proximity sensors, temperature sensors, wheel sensors, environment sensors, road sensors, etc. The environment sensors may be configured to detect environment conditions such as rainy, windy, snowy conditions, temperature and/or weather conditions in proximity to the vehicle 202. The road sensors may be configured to detect road conditions such as water logging on the road 104, water depth, water flow direction, water flow speed, water quality (muddy), and/or the like. The wheel sensors may be configured to detect wheel condition such as tire pressure. In addition, the VCU 206 or one or more sensors of the vehicle sensory system 234 may be configured to detect vehicle 202 speed, vehicle 202 direction, etc. In some aspects, the vehicle sensory system 234 may send measured sensory inputs to the memory 218 for storage purpose.

In some aspects, the VCU 206 may control vehicle 202 operational aspects and implement one or more instruction sets received from the mobile device 212, from one or more instruction sets stored in computer memory 218 of the automotive computer 204, including instructions operational as part of the vehicle stability control system 208.

The TCU 228 can be configured and/or programmed to provide vehicle connectivity to wireless computing systems onboard and off board the vehicle 202, and may include a Navigation (NAV) receiver 236 for receiving and processing a GPS signal, a BLE® Module (BLEM) 238, a Wi-Fi transceiver, a UWB transceiver, and/or other wireless transceivers (not shown in FIG. 2) that may be configurable for wireless communication between the vehicle 202 and other systems (e.g., a vehicle key fob, not shown in FIG. 2), computers, and modules. The TCU 228 may be disposed in communication with the ECUs 210 by way of a bus.

In one aspect, the ECUs 210 may control aspects of vehicle operation and communication using inputs from human drivers, inputs from an autonomous vehicle controller, the vehicle stability control system 208, and/or via wireless signal inputs received via the wireless connection(s) from other connected devices, such as the mobile device 212, the server(s) 220, among others.

The BCM 222 generally includes integration of sensors, vehicle performance indicators, and variable reactors associated with vehicle systems, and may include processor-based power distribution circuitry that can control functions associated with the vehicle body such as lights, windows, security, camera(s), audio system(s), speakers, door locks and access control, vehicle energy management, and various comfort controls. The BCM 222 may also operate as a gateway for bus and network interfaces to interact with remote ECUs (not shown in FIG. 2).

In some aspects, the DAT controller 230 may provide Level-1 through Level-3 automated driving and driver assistance functionality that can include, for example, active parking assistance, vehicle backup assistance, adaptive cruise control, lane keeping, and/or driver status monitoring, among other features. For example, the DAT controller 230 may enable the vehicle stability control system 208 to automatically (e.g., without vehicle operator involvement) control the vehicle 202 when the vehicle 202 is in the unstable driving state, based on the instructions generated by the vehicle stability control system 208. The DAT controller 230 may also provide aspects of user and environmental inputs usable for user authentication.

In some aspects, the automotive computer 204 may connect with an infotainment system 240 that may include a touchscreen interface portion, and may include voice recognition features, biometric identification capabilities that can identify users based on facial recognition, voice recognition, fingerprint identification, or other biological identification means. In other aspects, the infotainment system 240 may be further configured to receive user instructions via the touchscreen interface portion, and/or display notifications, navigation maps, etc. on the touchscreen interface portion.

The computing system architecture of the automotive computer 204, the VCU 206, and/or the vehicle parking assist system 208 may omit certain computing modules. It should be readily understood that the computing environment depicted in FIG. 2 is an example of a possible implementation according to the present disclosure, and thus, it should not be considered limiting or exclusive.

The vehicle 202 may further include a wheel drive motor 242 and a wheel steering actuator 244. As described in conjunction with FIG. 1, each wheel 106 may have its own independent drive motor and steering actuator. Consequently, although FIG. 2 depicts a single wheel drive motor 242 and a single wheel steering actuator 244, the vehicle 202 may include four wheel drive motors and four wheel steering actuators if the vehicle 202 has four wheels 106.

The wheel drive motor 242 may be configured to activate wheel 106 movement (e.g., movement in forward or backward direction) and control wheel 106 torque (or speed) and torque polarity based on inputs received from the vehicle stability control system 208. Similarly, the wheel steering actuator 244 may be configured to control wheel 106 rotation angle based on inputs received from the vehicle stability control system 208.

In accordance with some aspects, the vehicle stability control system 208 may be integrated with and/or executed as part of the ECUs 210. The vehicle stability control system 208, regardless of whether it is integrated with the automotive computer 204 or the ECUs 210, or whether it operates as an independent computing system in the vehicle 202, may include a transceiver 246, a processor 248, and a computer-readable memory 250. The transceiver 246 may be configured to receive information/inputs from external devices or systems, e.g., the mobile device 212, the server 220, and/or the like. Further, the transceiver 246 may transmit notifications (e.g., alert/alarm signals) to the external devices or systems. In addition, the transceiver 246 may be configured to receive information/inputs from vehicle 202 components such as the infotainment system 240, the vehicle sensory system 234, the memory 218, and/or the like. Further, the transceiver 246 may transmit notifications (e.g., alert/alarm signals, vehicle stability control instructions, etc.) to the vehicle 202 components such as the infotainment system 240, the wheel drive motor 242, the wheel steering actuator 244, etc.

The processor 248 and the memory 250 may be same as or similar to the processor 216 and the memory 218, respectively. Specifically, the processor 248 may utilize the memory 250 to store programs in code and/or to store data for performing aspects in accordance with the disclosure. The memory 250 may be a non-transitory computer-readable memory storing the vehicle stability control program code.

In operation, the transceiver 246 may be configured to receive environment condition, road condition, and vehicle information. In particular, the transceiver 246 may receive the environment condition, the road condition, and the vehicle information from one or more of the vehicle sensory system 234 (including road sensors, environment sensors, wheel sensors, etc.), vehicle camera (such as vehicle exterior camera), the server 220, and/or the memory 218. For example, the transceiver 246 may receive the road and environment condition from the server 220, the vehicle sensory system 234, and/or the memory 218 or memory 250. Further, the transceiver 246 may receive the vehicle information from the vehicle sensory system 234 and/or the memory 218 or memory 250. In some aspects, the transceiver 246 may obtain the environment condition, the road condition, and the vehicle information at a predefined frequency (e.g., in every 1 or 2 seconds).

The environment condition may include wind condition (such as wind speed, wind direction, etc.), local environment condition (such as ambient temperature, weather condition including presence of rain, snow, etc.), and/or the like.

The road condition may include water conditions (if water is present) on the road 104, such as water depth, water flow direction, water flow speed, water quality (muddy, salty, etc.), and/or the like. The road information may also include pre-wetting condition. The pre-wetting condition may include, for example, information whether the road 104 may be wet due to first rain of a season or due to water logging because of prolonged rains. In an exemplary aspect, the first rain of the season may indicate rain that may have occurred after a predefined time duration (e.g., after 30 days) of "no-rain" or dryness.

The environment condition and the road condition may provide an indication of presence of oil and other liquids on the road 104 that may reduce friction on the road 104. The vehicle information may include vehicle driving condition (such as speed, direction, ride-height, etc.), wheel condition (such as angle, torque, tire worn (tread), tire pressure, etc.), vehicle design, and vehicle weight, vehicle type, vehicle historical usage/travel information (such as roads travelled by the vehicle 202 frequently, driving time durations, associated wheel torque, wheel rotation angles), and/or the like.

Responsive to receiving the environment condition, the road condition and the vehicle information, the transceiver 246 may send the received condition/information to the memory 250 for storage purpose. In addition, the transceiver 246 may send the received condition/information to the processor 248.

The processor 248 may determine that the vehicle 202 may be in an unstable driving state based on the obtained environment condition, the road condition, and the vehicle information. Stated another way, the processor 248 may determine whether the vehicle 202 may be moving in control of the vehicle operator/DAT controller 230 or may be moving out of control. As an example, the processor 248 may determine that the vehicle 202 may be in the unstable driving state when the vehicle 202 weight may be less than a weight threshold, and water flow rate on the road 104 may be greater than a flow rate threshold. In this case, the weight threshold and the flow rate threshold may be pre-stored in the memory 250. As another example, the processor 248 may determine that the vehicle 202 may be in the unstable driving state when the wheel condition indicates worn tires and the water flow rate on the road 104 is greater than the flow rate threshold. As another example, the processor 248 may determine that the vehicle 202 may be in the unstable driving state when the wheel condition indicates worn tires and the road 104 may be wet due to first rain of a season (which may indicate presence of oil on the road 104). As another example, the processor 248 may determine that the vehicle 202 may be in the unstable driving state when the road 104 may be covered with snow and the vehicle 202 may be moving in high speed (e.g., greater than a vehicle speed threshold that may be pre-stored in the memory 250).

Responsive to determining that the vehicle 202 may be in the unstable driving state, the processor 248 may determine vehicle instability type. In particular, the processor 248 may determine the vehicle instability type based on the obtained environment condition, the road condition, and the vehicle information. Examples of vehicle instability type may include, but are not limited to, vehicle sliding, floating, rolling, stuck in snow/mud, and/or any other similar instability type. For example, the processor 248 may determine that the vehicle 202 may be sliding (due to hydroplaning) when water depth on the road 104 may be greater than a first threshold and less than a second threshold, and when one or more wheels 106 may be worn. In this case, the first threshold and the second threshold may be pre-stored in the memory 250. As another example, the processor 248 may determine that the vehicle 202 may be floating when the water depth on the road 104 may be greater than the second threshold and the vehicle 202 weight may be less than the weight threshold.

Responsive to determining the vehicle instability type, the processor 248 may determine optimum torque, torque polarity, and wheel rotation angle for each wheel 106, and generate instructions for each vehicle wheel 106 to counter the vehicle unstable driving state. The processor 248 may generate the instructions for each wheel 106 based on the determined vehicle instability type. For example, the processor 248 may generate a first instruction for the wheel 106a, a second instruction for the wheel 106b, a third instruction for the wheel 106c, and a fourth instruction for the wheel 106d. The generated instructions may enable respective wheel drive motor 242 and wheel steering actuator 244 to control the torque, torque polarity, and wheel rotation angle for each wheel 106.

Responsive to generating the instructions, the processor 248 may transmit the instructions to the respective wheel drive motor 242 and wheel steering actuator 244 (either directly or via the VCU 206). The wheel drive motor 242 and the wheel steering actuator 244 may control wheel 106 movement based on the received instructions. The details of controlling wheel 106 movement to counter different vehicle instability types/states may be understood in conjunction with FIGS. 3A, 3B, 4 and 5.

Figure 3B:
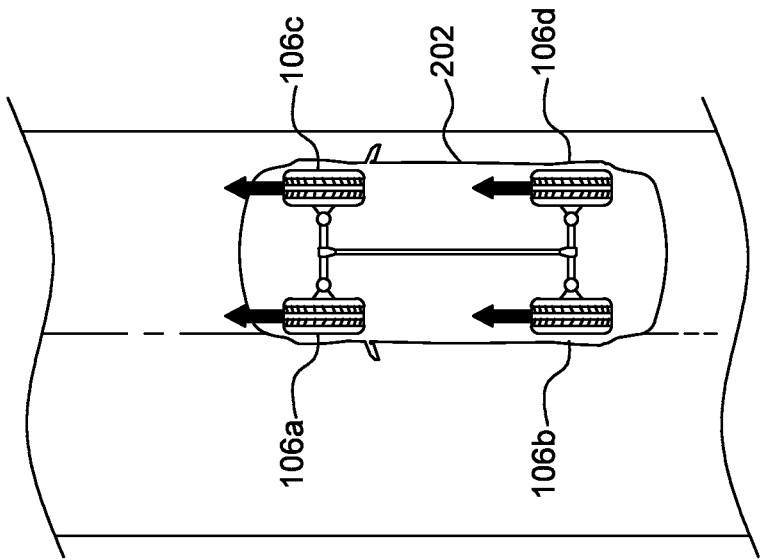
FIGS. 3A and 3B depict an exemplary embodiment to counter vehicle sliding condition in accordance with the present disclosure.
Figure 3A:
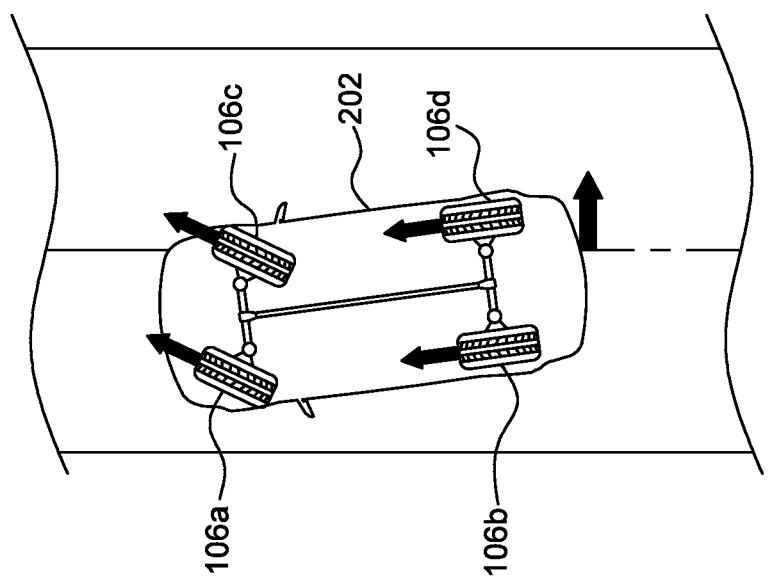

FIGS. 3A and 3B depict an exemplary embodiment to counter vehicle 202 sliding condition in accordance with the present disclosure. The vehicle 202 may have four wheels including a driver front side wheel 106a, a driver rear side wheel 106b, a passenger front side wheel 106c, and a passenger rear side wheel 106d (collectively referred to as wheels 106), as shown in FIGS. 3A and 3B. A person ordinarily skilled in the art may appreciate that the vehicle 202 may slide when lateral forces that may apply to a wheel 106 exceed traction available to the wheel 106. Stated another way, the vehicle 202 sliding condition may occur when the lateral forces applied to the wheel 106 exceed frictional force that may act between the wheel 106 and the road 104 surface.

The vehicle 202 may slide due to hydroplaning. In some aspects, when the vehicle 202 slides, vehicle rear wheels 106b, 106d may additionally slip (e.g., fishtailing) due to one or more reasons including, but not limited to, oversteering, understeering, sudden vehicle speed increase on wet surface, and/or the like. For example, the vehicle 202 may "fishtail" towards rear right side when the lateral forces exerted on the wheels 106b, 106d due to flow of water on the road 104 exceed traction available to the wheels 106b, 106d, as shown in FIG. 3A.

As described above, the processor 248 may obtain the environment condition, the road condition, and the vehicle information, and may determine that the vehicle 202 may be sliding based on the obtained condition. For example, the processor 248 may determine that the vehicle 202 may be sliding (as "vehicle instability type", e.g., due to hydroplaning) when the processor 248 determines that it may be raining on the road 104 (including road wetting condition), the vehicle 202 may be travelling with a speed greater than a speed threshold, and the wheel condition may indicate worn tires due to wear and tear.

Responsive to determining that the vehicle 202 may be sliding, the processor 248 may further determine additional sliding condition details. In some aspects, the additional sliding condition details may include sliding direction, angle of each wheel 106, torque of each wheel 106, one or more forces acting or exerting on the vehicle 202, and/or the like. For example, the processor 248 may determine that the vehicle 202 may be sliding towards right side from vehicle rear end (as shown in FIG. 3A), and corresponding sliding speed, wheel angle, wheel torque, etc. The processor 248 may further determine affected wheels and non-affected wheels based on the sliding condition details. For example, the processor 248 may determine that the rear wheels 106b and 106d may be the affected wheels (as the wheels 106b and 106d may be sliding and may have lost traction) and the front wheels 106a and 106c may be the non-affected wheels (as the wheels 106a and 106c may not be sliding laterally).

Responsive to determining the additional sliding condition details, the processor 248 may generate instructions to counter the sliding condition. For example, the processor 248 may generate instruction for one or more wheels 106a-

106d based on the sliding condition, and may transmit the instructions to respective wheel drive motor 242 and/or wheel steering actuator 244.

The wheel drive motor 242 and/or wheel steering actuator 244 may receive the instructions and may control the wheels 106a-106d based on the instructions. For example, the processor 248 may transmit instructions to rotate the wheels 106a and 106c towards the right side (same as the sliding direction of wheels 106b and 106d), as indicated in FIG. 3A, thereby localizing wheel rotation. The processor 248 may further transmit instructions to change/distribute wheel torque and localize wheel torque, and may cause the vehicle 202 to come back to the straight position without applying braking, as shown in FIG. 3B (thereby preventing oversteering or understeering).

In additional aspects of the present disclosure, the processor 248 may transmit the environment condition, the road condition, the vehicle information/condition, and the wheel torque, wheel rotation angle (from the generated instructions) to the server 220 (e.g., cloud) for storage purpose. In further aspects, the processor 248 may store the obtained environment condition, the road condition, the vehicle information/condition, and the wheel torque, wheel rotation angle (from the generated instructions) in the memory 250. When the processor 248 determines that the vehicle 202 may be navigating in same or similar conditions, the processor 248 may use the stored wheel torque and wheel rotation angle by using AI/ML algorithm (that may be pre-stored in the memory 250) to assist the vehicle 202 (or any other similar vehicle) in navigating in same or similar conditions. For example, the system may determine that the vehicle 102 may be navigating in same or similar conditions based on the real-time road condition and environment condition obtained by the system, and/or the vehicle historical usage/travel pattern (that may be part of the vehicle information). The processor 248 may determine that the road condition or environment condition may be same or different from road condition or environment conditions of earlier vehicle trips based on the obtained road condition and environment information.

In a scenario where the obtained road condition or environment condition may be different than the road condition or environment condition of earlier trips, the processor 248 may obtain the updated road condition or environment condition, and may update the stored wheel torque (and/or wheel rotation angle) based on the updated road condition or environment condition.

Figure 4:
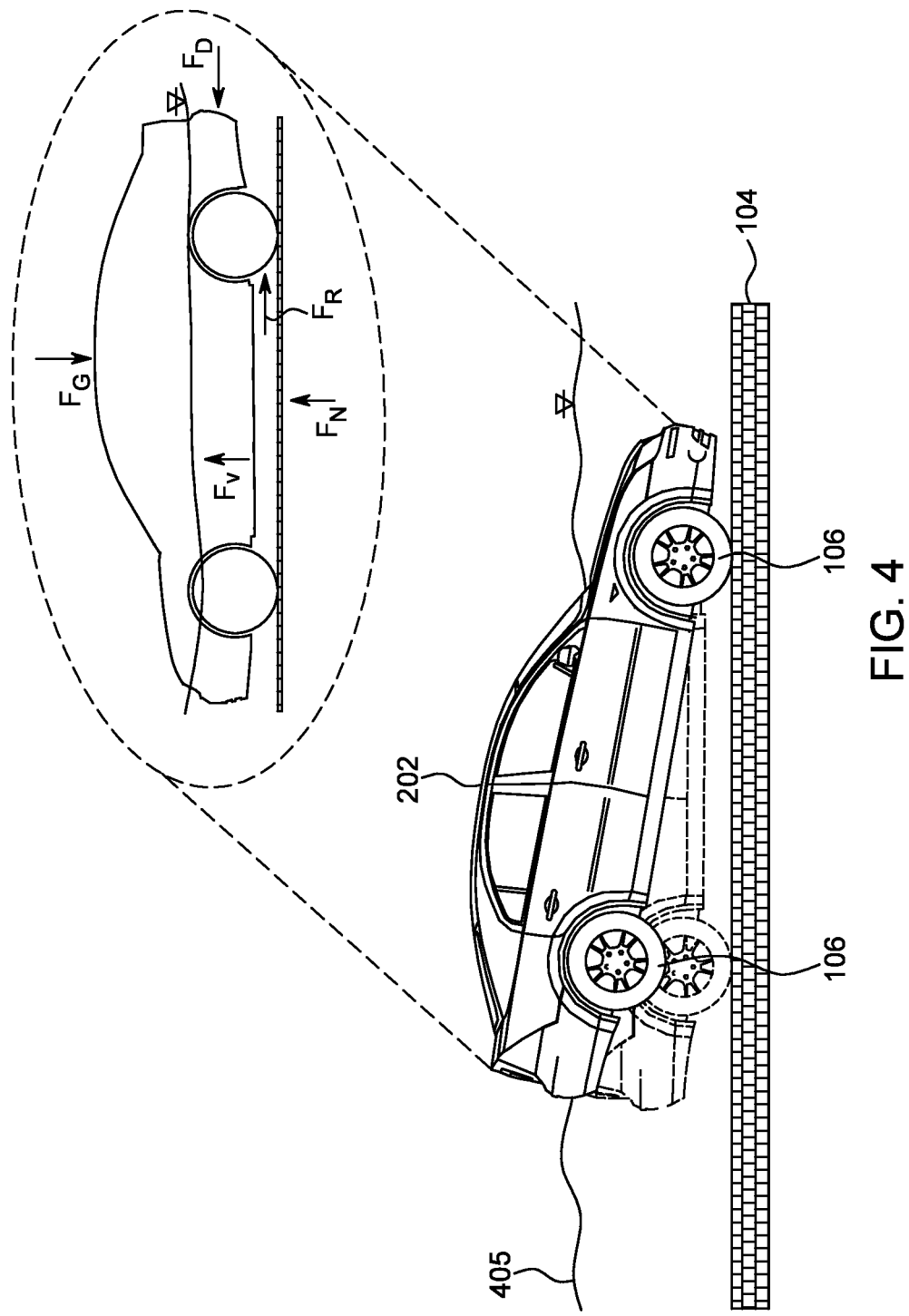
FIG. 4 depicts an exemplary embodiment to counter vehicle floating condition in accordance with the present disclosure.

FIG. 4 depicts an exemplary embodiment to counter vehicle floating condition in accordance with the present disclosure. A person ordinarily skilled in the art may appreciate that the vehicle 202 may experience or be subjected to one or more forces when the vehicle 202 is submerged in water 405. For example, as shown in FIG. 4, the vehicle 202 may be subjected to friction force ($F_R$), normal reaction force from the ground ($F_N$) that may be equivalent to net weight of the vehicle 202 ($F_G$), vertical pushing force ($F_V$) which may be equivalent to sum of buoyancy force and lift force, and drag force ($F_D$). The buoyancy force may be a resultant fluid force acting on the vehicle 202 in an upward vertical direction when the vehicle 202 may be submerged in the water 405. The lift force may be a component of a force that may be flowing past the vehicle 202 surface. The lift force may be perpendicular to incoming water direction. The drag force ($F_D$) may be defined as a resistance that the vehicle 202 may exert in moving through water. The drag force ($F_D$) may increase with vehicle speed, fluid density and vehicle size. The vehicle 202 may float in water when the vertical pushing force ($F_V$) exceeds vehicle weight. This condition (i.e., floating) may generally occur when the water flow depth may be high and vehicle speed may be low.

When the vehicle 202 may be submerged in the water 405, vehicle instability may vary based on various parameters. For example, vehicle instability may vary based on vehicle position/orientation with respect to water flow direction (e.g., depending on whether vehicle position/orientation is parallel to flow, perpendicular to flow, or at any other angle), level of submergence (fully or partially submergence), net vehicle 202 weight, or vehicle 202 aerodynamic shape. For example, the vehicle 202 may be subjected to greater force of draft when the vehicle 202 may be positioned perpendicular to water flow direction.

As described above, the processor 248 may be configured to determine that the vehicle 202 may be floating (as "vehicle instability type") based on the obtained environment condition, road condition, and the vehicle information. Responsive to determining that the vehicle 202 may be floating, the processor 248 may further receive details of forces acting on the vehicle 202. The processor 248 may then analyze the forces and determine "floating severity" associated with the vehicle 202. Responsive to determining the floating severity based on the forces, the processor 248 may determine/generate instructions for each wheel 106 to counter the floating condition.

For example, when the processor 248 determines that the vehicle 202 may be positioned perpendicular to water flow direction, the processor 248 may generate instructions to change vehicle 202 orientation. In particular, the processor 248 may generate instructions to change rotation angle of one or more wheels 106 such that the forces exerted by flowing water on the vehicle 202 may be reduced (e.g., by performing sideways/diagonal vehicle movement).

In further aspects, the processor 248 may generate instructions to change speed, torque, rotation angle associated with one or more wheels 106. For example, the processor 248 may generate instructions to change wheel torque to push down the vehicle 202 against the vertical pushing force ($F_V$).

The processor 248 may then transmit the instructions to respective wheel drive motor 242 and/or wheel steering actuator 244. The wheel drive motor 242 and/or wheel steering actuator 244 may receive the instructions, and may control the wheels 106 based on the received instructions to manage/counter the floating condition.

Figure 5:
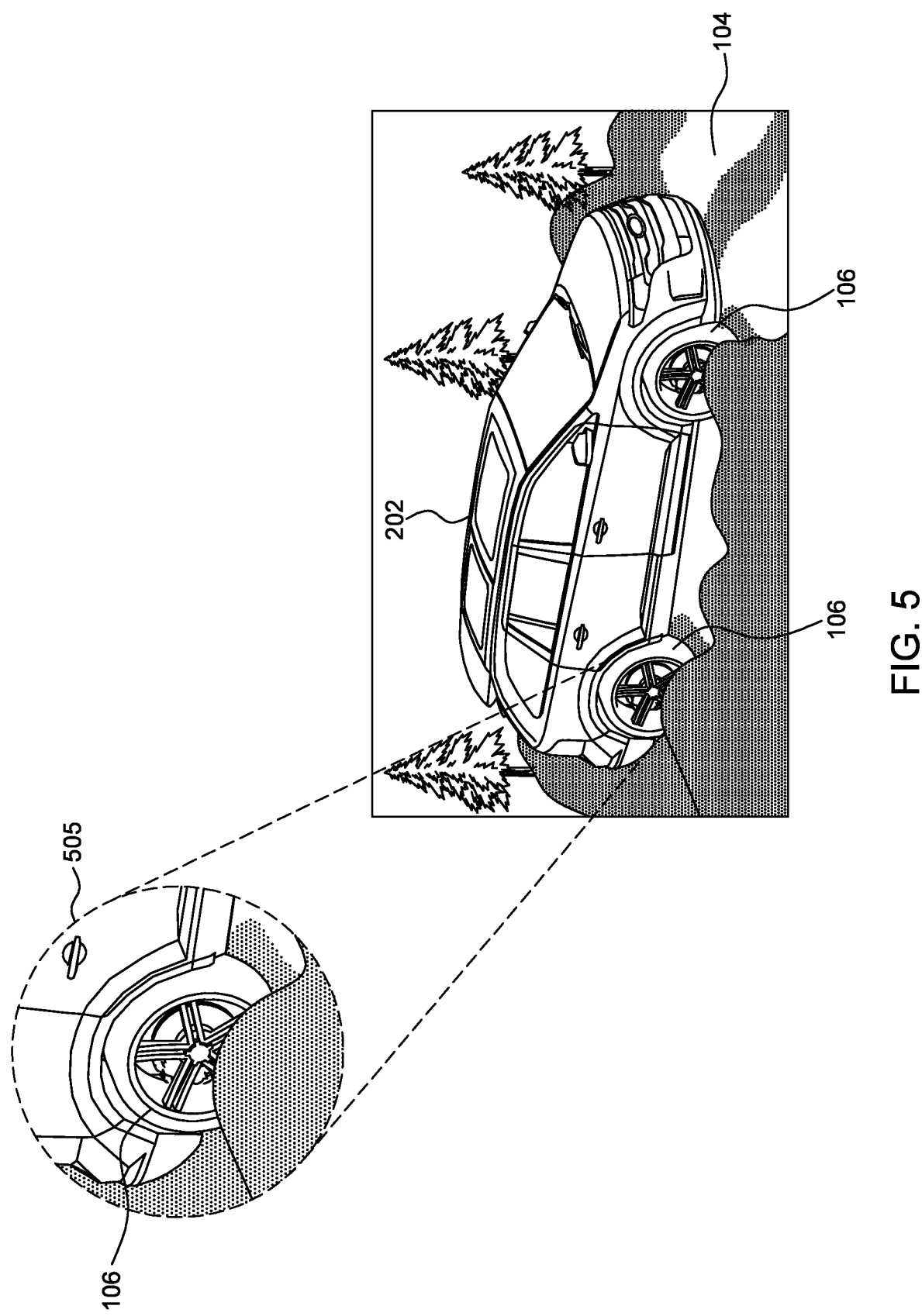
FIG. 5 depicts an exemplary embodiment to counter environmentally challenging condition for a vehicle in accordance with the present disclosure.

FIG. 5 depicts an exemplary embodiment to counter environmentally challenging condition for the vehicle 202 in accordance with the present disclosure. As shown in FIG. 5, the vehicle 202 may be travelling on the road 104 with environmental challenges such as snow, sand, mud, and/or the like. The processor 248 may determine that the vehicle 202 may be travelling on the road 104 with environmental challenges based on the obtained road condition, the environment condition and/or the vehicle information.

Responsive to determining that the vehicle 202 may be travelling on the road 104 with environmental challenges, the processor 248 may determine vehicle instability type based on the obtained condition information described above. For example, the processor 248 may determine if the vehicle 202 may be losing traction while moving on the road 104, or the vehicle 202 may be stuck in snow or sand. In addition, the processor 248 may determine affected wheels (e.g., wheels that may be stuck in the snow/sand), current/predicted depth of snow/sand, etc.

The processor 248 may be configured to generate instructions for each wheel 106 based on the determined vehicle instability type. For example, the processor 248 may generate instructions to manage wheel torque of each wheel 106 when the vehicle 202 may be moving in snow (or any other environmentally challenging road condition), when the vehicle 202 may be inside (e.g., stuck) in the snow, or after the vehicle 202 leaves the snow. The processor 248 may generate instructions to compensate local resistance with wheel torque adjustment to maintain same or equivalent speed/torque for all wheels 106 and keep the vehicle 202 moving, and/or to align all the wheels 106 in the snow to maintain vehicle 202 stability. For example, when the processor 248 generates instructions to steer front wheels (e.g., due to presence of obstacle), the processor 248 may generate instructions to align the rear wheels in the direction of front wheels to maintain vehicle stability.

In an exemplary scenario where the processor 248 determines that a wheel (e.g., the wheel 106) may be stuck in the snow, as shown in view 505, the processor 248 may generate instructions such that the wheel 106 may come out from the snow and the vehicle 202 may move. For example, the processor 248 may generate instructions to free the stuck wheel 106 and run a three-wheel mode (in which the other wheels may be powered at specific wheel torque). The processor 248 may generate the instruction to free the wheel 106 to prevent the wheel 106 from digging a deeper hole in the snow. The processor 248 may then transmit the instructions to respective wheel drive motor 242 and wheel steering actuator 244 (either directly or via the VCU 206). The wheel drive motor 242 and the wheel steering actuator 244 may control wheel 106 movement based on the received instructions. Such instructions may enable the vehicle 202 to come out from the unstable condition.

Once out of the snow, the processor 248 may generate instructions to power the wheel 106 slowly to keep the vehicle 202 moving, and transmit the instructions to the respective wheel drive motor 242 and wheel steering actuator 244. In further aspects, the processor 248 may generate instructions to use onboard independent rear suspension to adjust vehicle 202 leveling to shift weight away from the wheel 106 that may be stuck in the snow, and transmit the instructions to the VCU 206 for adjusting the vehicle 202 level.

In further aspects, the processor 248 may activate a "rocking" vehicle 202 mode when the vehicle 202 may be stuck in the snow (e.g., when all the wheels 106a-106d may be stuck in the snow). In the rocking mode, the processor 248 may generate instructions to move the vehicle 202 forward with front wheels push and rear wheels rolling free, and then move the vehicle 202 backward with rear wheel push and front wheels rolling free. Stated another way, the processor 248 may generate instructions to move the vehicle 202 forward by providing power only to the front wheels, and then move backwards by providing power only to the rear wheels, and so on until the vehicle 202 comes out from the snow/sand. The processor 248 may transmit the instructions to the respective wheel drive motor 242 and wheel steering actuator 244 to cause to-and-fro movement of the vehicle 202 such that the vehicle 202 comes out from the snow/sand.

Figure 6:
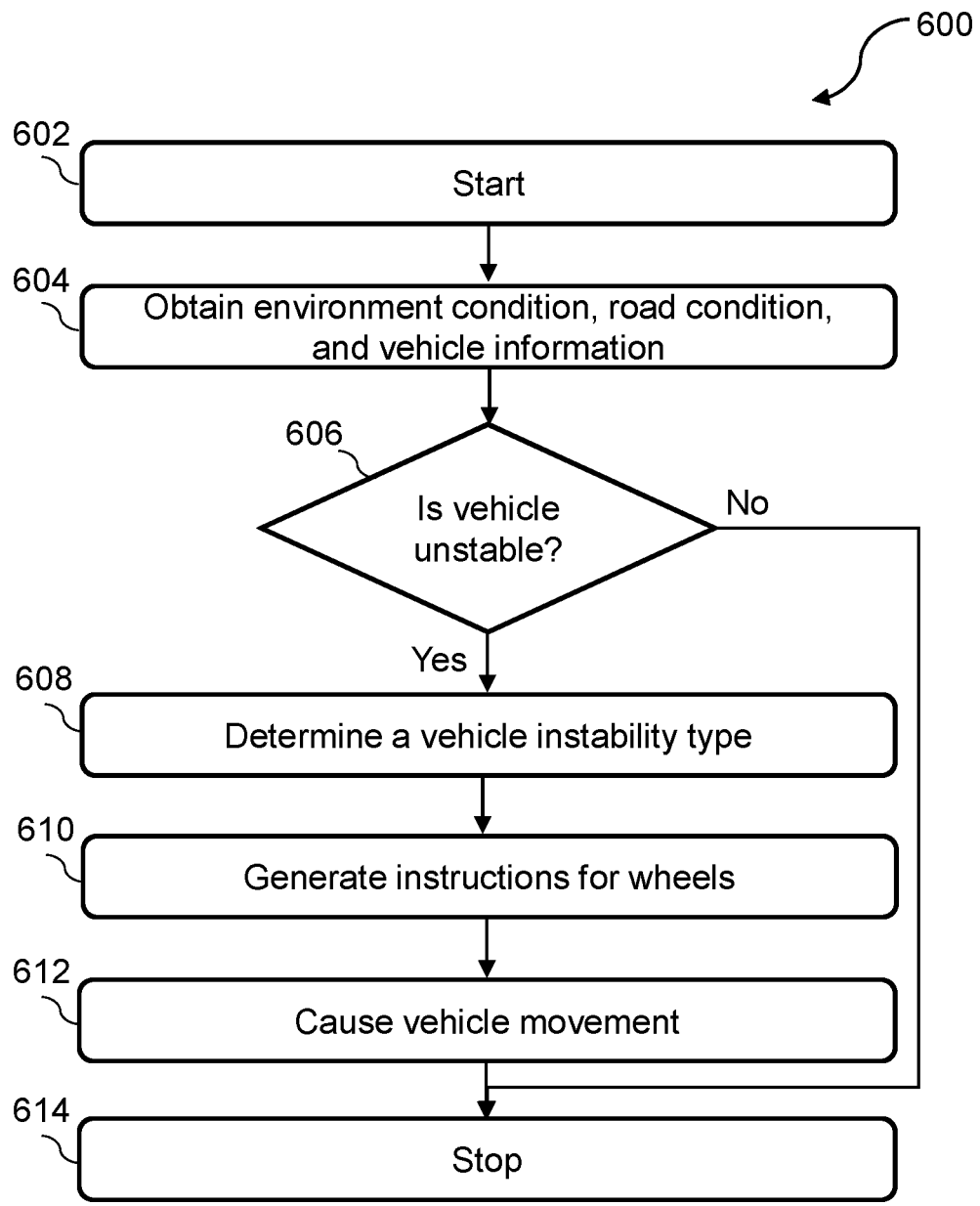
FIG. 6 depicts a flow diagram of an example method for managing hydroplaning and environmentally challenging conditions in accordance with the present disclosure.

FIG. 6 depicts a flow diagram of an example method for managing hydroplaning and environmentally challenging conditions in accordance with the present disclosure. FIG. 6 may be described with continued reference to prior figures. The following process is exemplary and not confined to the steps described hereafter. Moreover, alternative embodiments may include more or less steps that are shown or described herein and may include these steps in a different order than the order described in the following example embodiments.

Referring to FIG. 6, at step 602, the method 600 may commence. At step 604, the method 600 may include obtaining, by the processor 248, environment condition, road condition, and vehicle information. In particular, the processor 248 may obtain the environment condition, road condition, and vehicle information from the server 220, the vehicle sensory system 234, the memory 218 and/or the memory 250, as described above.

At step 606, the method 600 may include determining, by the processor 248, whether the vehicle 202 may be in an unstable state. In particular, the processor 248 may determine that the vehicle 202 may be in the unstable state (e.g., moving out of control of vehicle operator and/or DAT controller 230) based on the environment condition, the road condition, and the vehicle information.

Responsive to a determination that the vehicle 202 may be in a stable state (i.e., not in the unstable state), the method 600 moves to step 614 and stops.

Responsive to a determination that the vehicle 202 may be in the unstable state, the method 600 moves to step 608. At step 608, the method 600 may include determining, by the processor 248, a vehicle instability state. In particular, the processor 248 may determine the vehicle instability state based on the environment condition, the road condition, and the vehicle information. At step 610, the method 600 may include generating, by the processor 248, instructions for one or more wheels 106 based on the vehicle instability state, and may cause vehicle movement based on the generated instructions at step 612. In particular, the processor 248 may transmit the instructions to the wheel drive motor 242 and/or the wheel steering actuator 244 to manage/counter the vehicle unstable state.

At step 614, the method 600 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and nonlimiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
    a transceiver configured to receive environment condition, road condition, and vehicle information; and
    a processor communicatively coupled to the transceiver, wherein the processor is configured to:
        obtain the environment condition, the road condition, and the vehicle information from the transceiver;
        determine, based on the road condition, a pre-wetting condition of a road, the pre-wetting condition indicating that the road is wet from either multiple occurrences of rain over a period of time or a first rain after a dry period without rain;
        determine, based on the environment condition, the road condition, including the pre-wetting condition, and the vehicle information, that the vehicle is in an unstable driving state;
        determine, based on the vehicle being in the unstable driving state, that the vehicle is hydroplaning;
        generate, based on the determination that the vehicle is hydroplaning, a first instruction for a first vehicle wheel and a second instruction for a second vehicle wheel; and
        cause, based on the first instruction and the second instruction, a vehicle movement.

2. The vehicle of claim 1, wherein the vehicle information comprises vehicle driving condition, wheel condition, vehicle design, and vehicle weight.

3. The vehicle of claim 1, wherein the environment condition comprises wind conditions, temperature, and weather condition.

4. The vehicle of claim 1, wherein the processor determines that the vehicle is hydroplaning based on the environment condition, the road condition, and the vehicle information.

5. The vehicle of claim 1, wherein the processor generates the first instruction to change a rotation angle and/or a torque of the first vehicle wheel, and wherein the processor generates the second instruction to change a rotation angle and/or a torque of the second vehicle wheel.

6. The vehicle of claim 1 further comprising:
    a first wheel drive motor and a first wheel steering actuator configured to control first vehicle wheel movement; and
    a second wheel drive motor and a second wheel steering actuator configured to control second vehicle wheel movement.

7. The vehicle of claim 6, wherein the processor is configured to cause the vehicle movement by transmitting the first instruction to the first wheel drive motor and the first wheel steering actuator, and the second instruction to the second wheel drive motor and the second wheel steering actuator.

8. A method for controlling a vehicle comprising:
    obtaining, by a processor, an environment condition, a road condition, and vehicle information from a transceiver;
    determining, by the processor and based on the environment condition, the road condition, and the vehicle information, that the vehicle is at least partially submerged within water;
    determining, by the processor, that a vertical pushing force on the vehicle exceeds a weight of the vehicle, wherein the vertical pushing force is a sum of a buoyancy force on the vehicle and a drag force on the vehicle;
    determining, by the processor and based on the vehicle being at least partially submerged within the water, and the vertical pushing force on the vehicle exceeding the weight of the vehicle, a floating condition associated with the vehicle;
    generating, by the processor and based on the determination of the floating condition, a first instruction for a first vehicle wheel and a second instruction for a second vehicle wheel; and
    causing, by the processor and based on the first instruction and the second instruction, a vehicle movement to counter the floating condition.

9. The method of claim 8, wherein the vehicle information comprises vehicle driving condition, wheel condition, vehicle design, and vehicle weight.

10. The method of claim 8, wherein the environment condition comprises wind conditions, temperature, and weather conditions.

11. The method of claim 8, wherein the road condition comprises water condition on road, and pre-wetting condition.

12. The method of claim 8, wherein determining the floating condition is based on the environment condition, the road condition, and the vehicle information.

13. The method of claim 8, wherein the first instruction is generated to change a rotation angle and/or a torque of the first vehicle wheel, and wherein the second instruction is generated to change a rotation angle and/or a torque of the second vehicle wheel.

14. The method of claim 8, wherein the vehicle comprises:
   a first wheel drive motor and a first wheel steering actuator configured to control first vehicle wheel movement; and
   a second wheel drive motor and a second wheel steering actuator configured to control second vehicle wheel movement.

15. The method of claim 14, wherein causing the vehicle movement comprises transmitting the first instruction to the first wheel drive motor and the first wheel steering actuator, and the second instruction to the second wheel drive motor and the second wheel steering actuator.

16. The method of claim 8, further comprising:
   determining, by the processor, that the vehicle is positioned perpendicular to a water flow direction; and
   cause, by the processor, to change an orientation of the vehicle relative to the water flow direction.

17. A non-transitory computer-readable storage medium having instructions stored thereupon which, when executed by a processor, cause the processor to:

obtain environment condition, road condition, and vehicle information from a transceiver;

determine, based on the road condition, a pre-wetting condition of a road, the pre-wetting condition indicating that the road is wet from either multiple occurrences of rain over a period of time or a first rain after a dry period without rain;

determine that a vehicle is in an unstable driving state based on the environment condition, the road condition, including the pre-wetting condition, and the vehicle information;

determine, based on the vehicle being in the unstable driving state, that the vehicle is hydroplaning;

generate a first instruction for a first vehicle wheel and a second instruction for a second vehicle wheel based on the determination that the vehicle is hydroplaning mud; and cause a vehicle movement based on the first instruction and the second instruction.

18. The non-transitory computer-readable storage medium of claim 17, wherein generating the first instruction and the second instruction further comprises activating a rocking mode of a vehicle.

19. The non-transitory computer-readable storage medium of claim 17, wherein generating the first instruction and the second instruction further comprises operating the vehicle in a three-wheel mode in which the second vehicle wheel, a third vehicle wheel, and a fourth vehicle wheel are driven instead of the first vehicle wheel.

20. The non-transitory computer-readable storage medium of claim 17, wherein the instructions further cause the processor to generate a third instruction to use an independent rear suspension of the vehicle to shift a weight of the vehicle away from the first vehicle wheel.

* * * * *